US007688760B2

(12) United States Patent
Xu et al.

(10) Patent No.: US 7,688,760 B2
(45) Date of Patent: Mar. 30, 2010

(54) METHOD AND APPARATUS FOR AN EXCHANGE OF PACKET DATA BETWEEN A WIRELESS ACCESS TERMINAL AND A PACKET SWITCHED COMMUNICATION SYSTEM VIA A CIRCUIT SWITCHED COMMUNICATION SYSTEM

(75) Inventors: Xiang Xu, Nanjing (CN); Shahab M. Sayeedi, Naperville, IL (US); Joseph R. Schumacher, Glen Ellyn, IL (US)

(73) Assignee: Motorola, Inc, Schaumburg, IL (US)

( * ) Notice: Subject to any disclaimer, the term of this patent is extended or adjusted under 35 U.S.C. 154(b) by 420 days.

(21) Appl. No.: 11/430,101

(22) Filed: May 8, 2006

(65) Prior Publication Data

US 2006/0268840 A1    Nov. 30, 2006

Related U.S. Application Data

(60) Provisional application No. 60/681,941, filed on May 16, 2005.

(51) Int. Cl.
  H04L 12/28    (2006.01)
  H04L 12/66    (2006.01)
  H04L 12/56    (2006.01)
(52) U.S. Cl. ................ 370/255; 370/352; 370/401
(58) Field of Classification Search ......... 370/352–357, 370/255, 400, 401
  See application file for complete search history.

(56) References Cited

U.S. PATENT DOCUMENTS 6,385,179 B1 * 5/2002 Malcolm et al. ............ 370/329
6,879,581 B1 * 4/2005 Leung .......................... 370/352
2002/0110104 A1 * 8/2002 Surdila et al. ............... 370/338
2003/0053475 A1 * 3/2003 Veeraraghavan et al. .... 370/431
2003/0086418 A1 * 5/2003 McIntosh et al. ............ 370/356
2003/0104813 A1 * 6/2003 Julka et al. .................. 455/436
2003/0218997 A1 * 11/2003 Lohtia et al. ................ 370/335
2004/0090951 A1 * 5/2004 Jung ............................ 370/352
2004/0120283 A1 * 6/2004 Rezaiifar et al. ............ 370/328
2004/0196829 A1 * 10/2004 Mandayam et al. ......... 370/352
2004/0203770 A1 * 10/2004 Chen et al. ................ 455/435.1
2005/0041640 A1 * 2/2005 Nasielski et al. ............ 370/352
2005/0181773 A1 * 8/2005 Chang ...................... 455/414.1
2007/0005803 A1 * 1/2007 Saifullah et al. ............ 709/245

OTHER PUBLICATIONS

Guo, Chunglong et al.: "Low Power Distributed MAC For Ad Hoc Sensor Radio Networks", IEEE Globecom, 2001, 0-7803-7206-9/01/ 2001, IEEE, pp. 2944-2948.

* cited by examiner

Primary Examiner—Hong Cho
(74) Attorney, Agent, or Firm—Steven A. May

(57) ABSTRACT

A communication system is provided that allows a Hybrid Access Terminal (HAT) that is monitoring, or is engaged in a circuit voice call in, a circuit switched network and has a dormant packet data session anchored on a packet switched network, to send packet data to, and to receive packet data from, a packet data network connected to the packet switched network without having to switch to the packet switched network and even though a packet data session is not established in the circuit switched network.

37 Claims, 6 Drawing Sheets

METHOD AND APPARATUS FOR AN EXCHANGE OF PACKET DATA BETWEEN A WIRELESS ACCESS TERMINAL AND A PACKET SWITCHED COMMUNICATION SYSTEM VIA A CIRCUIT SWITCHED COMMUNICATION SYSTEM

CROSS-REFERENCE(S) TO RELATED APPLICATION(S)

The present application claims priority from provisional application Ser. No. 60/681,941, entitled "METHOD AND APPARATUS FOR AN EXCHANGE OF PACKET DATA BETWEEN A WIRELESS ACCESS TERMINAL AND A PACKET SWITCHED COMMUNICATION SYSTEM VIA A CIRCUIT SWITCHED COMMUNICATION SYSTEM," filed May 16, 2005, which is commonly owned and incorporated herein by reference in its entirety.

FIELD OF THE INVENTION

The present invention relates generally to wireless communication systems, and more specifically to an exchange of packet data between a wireless access terminal and a packet switched communication system via a conventional cellular communication system.

BACKGROUND OF THE INVENTION

The evolution of cellular communications has resulted in a proliferation of networks of different technologies and corresponding different air interfaces. In order to provide nearly universal coverage and a continuity of communications, wireless mobile stations have been, or are being, developed that are capable of operation in each of multiple networks, wherein each such network implements a different technology than the other networks of the multiple networks. Among the different network technologies are CDMA (Code Division Multiple Access) technologies, such as CDMA 2000 HRPD (High Rate Packet Data), that are capable of providing HRPD communication services, and conventional, or circuit switched, CDMA cellular communication technologies, such as a CDMA 3G1X.

Currently, the Third Generation Partnership Project 2 (3GPP2) standards provide a Short Data Burst (SDB) feature for 3G1X systems that permits a transfer of data frames between a packet data network and a mobile station (MS) over a traffic channel of the 3G1X network when the MS is engaged in an active voice or packet data call and over a common channel of the 3G1X network when the MS's packet data session is dormant and the MS is not engaged in a voice call. The 3GPP2 standards further provide a similar functionality for HRPD communication systems, that is, a Data Over Signaling (DOS) feature, for a transfer of 'higher layer' data between an HRPD network and an MS over either a common channel or a traffic channel of the HRPD network. For example, the SDB and DOS features may be used to transfer instant messaging text, email, or a web page to an MS otherwise engaged after a packet data communication session is established between the MS and the 3G1X or HRPD network, respectively.

As network operators begin deploying HRPD networks in combination with their 3G1X networks, some operators plan to allocate circuit-based, or circuit switched, services exclusively to 3G1X network resources and to transfer all packet data traffic received from or intended for the Internet via the HRPD networks. In such hybrid systems, when the MS is in the 3G1X network, for example, and is active with a circuit voice call or is idle and monitoring a 3G1X paging channel, the MS cannot exchange HRPD DOS with the Internet via the HRPD network. In order to provide such packet data to such an MS, it has been proposed, in U.S. patent application publication no. 2004/0120283, that when packet data arrives from the Internet for the MS, the HRPD network request the 3G1X network to page the MS to request that the MS move to the HRPD network so that the packet data can be delivered to the MS. Further, if an MS in the 3G1X network needs to send small amounts of data to the packet data network, the MS will have to drop its circuit call if it has one and move to the HRPD network in order to transfer the packet data. After the MS has switched to the HRPD network, when a circuit switched voice call (a 3G1X service) is received for an MS that is monitoring or active with a packet data session on an HRPD network, the MS is "cross-paged" on the HRPD network, that is, is notified, via a page from the HRPD network, of the 3G1X service. The MS must then leave the packet data session on the HRPD network (which may go dormant) and move back to the 3G1X network to accept the circuit voice call. Alternatively, an MS may be configured to return to the 3G1x after a period of time when no additional packet data is sent or received on the HRPD network. The need for an MS in a 3G1X system to switch back to the packet data network where its packet data session is anchored in order to send or receive a small amount of packet data, possibly dropping any circuit voice call in the process, then returning back to the 3G1X circuit network to resume circuit services, is inconvenient for the user of the MS and wasteful of system resources.

Therefore, a need exists for an improved method and apparatus for transferring packet data between an MS in a 3G1X network and the MS's packet data session which is anchored on a packet data network without the MS having to leave the circuit network and move back to the packet data network.

DETAILED DESCRIPTION OF THE INVENTION

Figure 1:
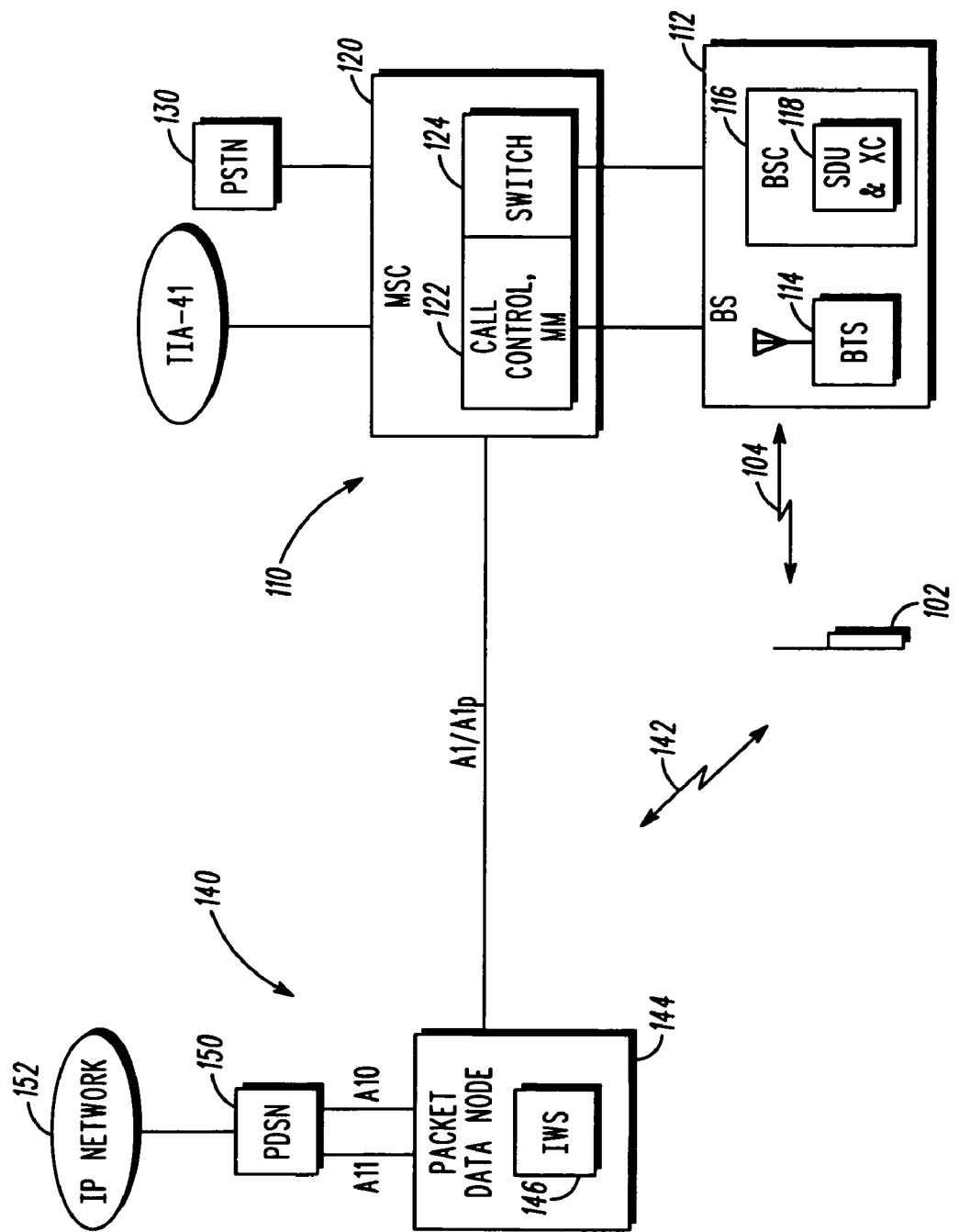
FIG. 1 is a block diagram of a wireless communication system in accordance with an embodiment of the present invention.

To address the need for an improved method and apparatus for transferring packet data between an MS in a 3G1X network and the MS's packet data session which is anchored on a packet switched network, without the MS having to leave the circuit data network to retrieve its data, a communication system is provided that allows a Hybrid Access Terminal (HAT) that is monitoring, or is engaged in a circuit voice call in, a circuit switched network and has a dormant packet data session anchored on a packet switched network, to send packet data to, and to receive packet data from, a packet data network connected to the packet switched network without having to switch to the packet switched network and even though a packet data session is not established in the circuit switched network.

Generally, an embodiment of the present invention encompasses a method for conveying packet data including monitoring, by a HAT, a forward channel of an air interface associated with a circuit switched communication network, maintaining a packet data session associated with the HAT in a packet switched communication network, and conveying packet data by the HAT to the packet switched communication network via the circuit switched communication network.

Another embodiment of the present invention encompasses a encompasses a method for transferring packet data from a HAT to a packet switched communication network via a circuit switched communication network, the method including receiving, by the circuit switched communication network from the HAT via a circuit switched communication network air interface, packet data intended for a packet data network connected to the packet switched communication network and forwarding the packet data to at least one of an Access Network and a Packet Control Function of the packet switched communication network.

Yet another embodiment of the present invention encompasses a encompasses a method for providing packet data associated from a packet switched communication network to a HAT monitoring a forward channel in a circuit switched communication network via the circuit switched communication network, the method including receiving, by a mobile switching center of the circuit switched communication network from the packet switched network, packet data intended for the HAT and conveying the packet data to the HAT via an air interface associated with the circuit switched communication network and without requiring the HAT to switch to the packet switched communication network.

Still another embodiment of the present invention encompasses a method for providing packet data associated with a packet switched communication network to a HAT via a circuit switched communication network, the method including receiving, by a mobile switching center of the circuit switched communication network from the packet switched network, packet data intended for the HAT, conveying the packet data to a base station by the mobile switching center, rejecting, by the base station, a request to convey the packet data to the HAT, and informing, by the base station of the mobile switching center, of the rejection of the request.

Yet another embodiment of the present invention encompasses a wireless access terminal that monitors a channel of an air interface associated with a circuit switched network while a packet data session is associated with the wireless access terminal in a packet switched communication network and conveys packet data to the packet switched communication network via the circuit switched communication network.

Still another embodiment of the present invention encompasses a communication system that provides for inter-network transfer of packet data from a HAT to a packet switched communication network via a circuit switched communication network. The communication system includes a base station of the circuit switched communication network that receives, from the HAT via an air interface associated with the circuit switched communication network, packet data that is intended for the packet data network connected to the packet switched communication network and that is included in a circuit switched communication network air interface message, and conveys the packet data to a mobile switching center. The communication system further includes a mobile switching center of the circuit switched communication network that is in communication with the base station and that receives the packet data from the base station and conveys the packet data to at least one of an Access Network and a Packet Control Function of the packet switched communication network.

Yet another embodiment of the present invention encompasses a communication system that provides for inter-network transfer of packet data from a packet switched communication network to a HAT via a circuit switched communication network. The communication system includes a mobile switching center of the circuit switched communication network that receives packet data from the packet switched communication network that is intended for the HAT and conveys the packet data to a base station of the circuit switched communication network. The communication system further includes a base station of the circuit switched communication network that is in communication with the mobile switching center and that receives the packet data from the mobile switching center and conveys the packet data to the HAT via an air interface associated with the circuit switched communication network, and wherein the HAT is not required to switch to the packet switched communication network in order to receive the packet data.

Still another embodiment of the present invention encompasses a communication system that provides for inter-network transfer of packet data from a packet switched communication network to a HAT via a circuit switched communication network. The communication system includes a mobile switching center of the circuit switched communication network that receives packet data from the packet switched communication network that is intended for the HAT and conveys the packet data to a base station of the circuit switched communication network. The communication system further includes a base station of the circuit switched communication network that is in communication with the mobile switching center and that receives the packet data from the mobile switching center, rejects a request to convey the packet data to the HAT, and informs the mobile switching center of the rejection of the request.

The present invention may be more fully described with reference to FIGS. 1-9. FIG. 1 is a block diagram of a wireless communication system 100 in accordance with an embodiment of the present invention. Communication system 100 includes a wireless circuit switched cellular CDMA (Code Division Multiple Access) communication network 110, such as a CDMA 3G1X network, and a wireless packet switched communication network 140, preferably a High Rate Packet Data (HRPD) network such as a CDMA 2000 HRPD (High Rate Packet Data) network. Circuit switched network 110 includes a Base Station (BS) 112 that comprises a Base Transceiver Station (BTS) 114 operably coupled to a Base Station Controller (BSC) 116. BS 112 is coupled to a Mobile Switching Center (MSC) 120. MSC 120 includes a call control and mobility management functionality 122 and a switching functionality 124 and further provides a gateway to a circuit switched network, such as Public Switched Telephone Network (PSTN) 130. BSC 116 provides selection and distribution unit functionality 118 with respect to messages received from Access Terminals (ATs) serviced by the BSC and further provides transcoding functionality 118 with respect to transcoding between the vocoder formats provided by the ATs and the vocoder formats provided by networks coupled to network 110, such as a 64 kbps Pulse Code Modulation (PCM) format (ITU-T G.711) transported by PSTN 130.

Packet switched network 140 comprises a packet-based wireless packet data node 144 coupled to a Packet Data Serving Node (PDSN) 150 via an A10 interface and an A11 interface. PDSN 150 is further coupled to an external packet data network 152, for example, an Internet Protocol (IP) network such as the Internet. Packet data node 144 provides wireless packet data communication services to ATs located in a coverage area of the packet data node. Preferably, packet data node 144 comprises an Access Network (AN) (not shown) and a Packet Control Function (PCF) (not shown) that are coupled to each other via one or more bearer connection and an A9 signaling connection. The functionality described herein as being performed by packet data node 144 may be performed by either the AN or the PCF or may be distributed among the AN and the PCF.

Each of BS 112 and packet data node 144 provides wireless communication services to Hybrid Access Terminals (HATs) located in a coverage area of the BS or packet data node via a respective 3G1X air interface 104 and HRPD air interface 142. Each air interface 104, 142 includes a forward link that includes a pilot channel, at least one forward link traffic channel, and forward link common and dedicated signaling channels. Each air interface 104, 142 further includes a reverse link that includes at least one reverse link traffic channel, reverse link common and dedicated signaling channels, and an access channel.

Communication system 100 further includes a Hybrid Access Terminal (HAT) 102, for example but not limited to a cellular telephone, a radiotelephone, or a Personal Digital Assistant (PDA), personal computer (PC), or laptop computer equipped for wireless voice communications. In various communications systems, HAT 102 may also be referred to as a subscriber unit (SU), a mobile station (MS), or a user's equipment (UE). HAT 102 comprises a hybrid terminal that is capable of engaging in a packet data call with packet switched network 140 and is further capable of engaging in a conventional cellular call with circuit switched network 110, and more particularly is capable of communicating with packet data node 144 via the 3GPP2 C.S0024 protocol and with BS 112 via the 3GPP2-C.S0001-C.S0005 protocols.

Circuit switched network 110 and packet switched network 140, and more particularly MSC 120 and packet data node 144, communicate with each other via an Interworking Solution function (IWS) 146. IWS 146 provides an interworking function between packet switched network 140 and circuit switched network 110 via an A1/A1p interface and supports A1/A1p signaling with the circuit switched network. IWS 146 further interfaces to packet switched network 140 and supports packet switched, and in particular HRPD, signaling. IWS 146 encapsulates circuit switched network signaling in packet switched, and in particular HRPD signaling, thereby permitting a circuit switched page message to be transported in an HRPD 3G1X Parameters message over the air to a HAT via the C.S0024-A Circuit Services Notification Protocol. IWS 146 further provides the interworking function allowing the packet switched network to request delivery of an HRPD packet data service request to a HAT in the circuit switched network, thereby permitting an HRPD page message or an HRPD Data Over Signaling (DOS) message to be transported over circuit switched network 110 to a HAT as a circuit switched page message or a circuit switched network Data Burst or signaling message, respectively. In one embodiment of the present invention, IWS 146 may reside in packet data node 144, and more particularly in either the AN or the PCF, and be connected to MSC 120 via an A1/A1p interface. When IWS 162 resides in the AN, then the AN is connected to MSC 120 via an A1/A1p interface, and when the IWS resides in the PCF, then the PCF is connected to MSC 120 via an A1/A1p interface. In another embodiment of the present invention, IWS may be interposed between MSC 120 and packet data node 144 in communication system 100 and be coupled to MSC 120 via an A1/A1p interface or to packet data node 144 via an Ay interface. However, one of ordinary skill in the art realizes that the precise location of IWS 146 is not critical to the invention.

Figure 2:
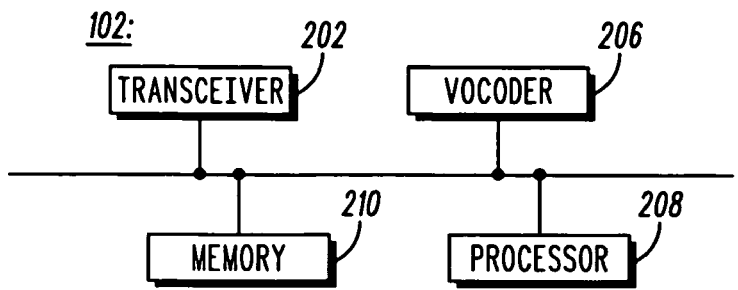
FIG. 2 is a block diagram of the Hybrid Access Terminal of FIG. 1 in accordance with an embodiment of the present invention.

Referring now to FIG. 2, an architecture of HAT 102 is provided in accordance with an embodiment of the present invention. HAT 102 may include at least one transceiver 202 that allows the HAT to transmit or receive in each of the two networks. Transceiver 202 is coupled to a vocoder 206 and a processor 208, which processor is further coupled to an at least one memory device 210. HAT 102 may maintain apriori information in at least one memory device 210 that facilitates the switching between networks 110 and 140. Processor 208 may comprise one or more microprocessors, microcontrollers, digital signal processors (DSPs), combinations thereof or such other devices known to those having ordinary skill in the art, which processor is configured to execute the functions described herein as being executed by HAT 102. The at least one memory device 210 may comprise random access memory (RAM), dynamic random access memory (DRAM), and/or read only memory (ROM) or equivalents thereof, that store data and programs that may be executed by the associated processor and that allow HAT 102 to perform all functions necessary to operate in communication system 100.

Figure 3:
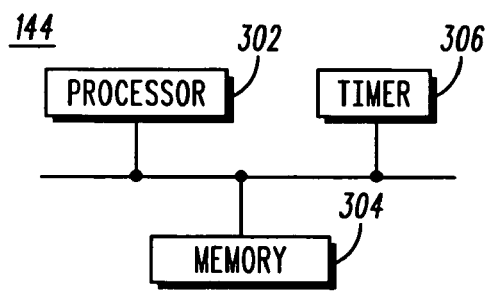
FIG. 3 is a block diagram of an architecture of the packet data node of FIG. 1 in accordance with an embodiment of the present invention.
Figure 4:
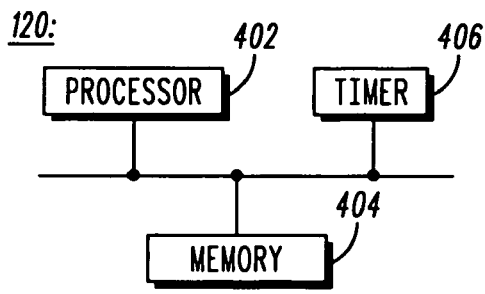
FIG. 4 is a block diagram of an architecture of the Mobile Switching Center of FIG. 1 in accordance with an embodiment of the present invention.
Figure 5:
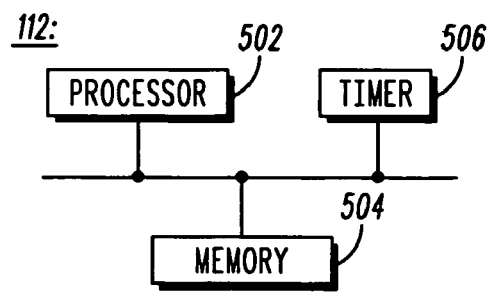
FIG. 5 is a block diagram an architecture of the Base Station of FIG. 1 in accordance with an embodiment of the present invention.

Referring now to FIGS. 3, 4, and 5, an architecture of each of packet data node 144, MSC 120, and BS 112 is provided in accordance with an embodiment of the present invention. Each of packet data node 144, MSC 120, and BS 112 includes a respective processor 302, 402, 502 such as one or more microprocessors, microcontrollers, digital signal processors (DSPs), combinations thereof or such other devices known to those having ordinary skill in the art, which processor is configured to execute the functions described herein as respectively being executed by the packet data node, MSC, and BS. Each of packet data node 144, MSC 120, and BS 112 further includes a respective at least one memory device 304, 404, 504 that may comprise random access memory (RAM), dynamic random access memory (DRAM), and/or read only memory (ROM) or equivalents thereof, that store data and programs that may be executed by the associated processor and that allow the packet data node, MSC, and BS to perform all functions necessary to operate in communication system 100. When packet data node 144 comprises an AN and a PCF, the functions described herein as being performed by the packet data node may be performed by a processor included in the AN or a processor included in the PCF or may be distributed among the processors of the AN and the PCF based on data and programs respectively stored in a corresponding at least one memory device of the AN and the PCF. When BS 112 comprises BTS 114 and a BSC 116, the functions described herein as being performed by the BS may be performed by a processor included in BTS 114 or a processor included in BSC 116 or may be distributed among the processors of BTS 114 and BSC 116 based on data and programs respectively stored in a corresponding at least one memory device of BTS 114 and BSC 116. Each of packet data node 144, MSC 120, and BS 112 further includes a respective timer 306, 406, and 506 that is coupled to the respective processor and at least one memory device of the packet data node, MSC, and BS and that permits the packet data node, MSC, or BS to perform any timer functions described herein.

In order for HAT 102 to engage in a circuit voice call or a packet data call respectively via circuit switched network 110 or packet switched network 140, each of HAT 102, circuit switched network 110, and packet switched network 140 operates in accordance with well-known wireless telecommunications protocols. Preferably, packet switched network 140 is a CDMA (Code Division Multiple Access) 2000 communication system that provides HRPD communication services to subscribers serviced by the network and that operates in accordance with the 3GPP2 (Third Generation Partnership Project 2) C.S0024-A standard, which provides an air interface compatibility standard for CDMA 2000 HRPD (High Rate Packet Data) systems. Preferably, circuit switched network 110 is a CDMA 2000 communication system that provides circuit switched communication services to subscribers serviced by the network (it may also provide packet data services) and that operates in accordance with the 3GPP2 C.S0001 to C.S0005 standards, which provides an air interface compatibility standard for CDMA 3G1X systems.

Further, network 110 and HAT 102 preferably operate in accordance with the 3GPP2 A.S0011-A.S0017 Inter Operability Specifications (IOSs) standards, which provide a compatibility standard for cellular mobile telecommunications systems that operate as a CDMA 2000 3G1X system. In addition, network 140 and again HAT 102 preferably operate in accordance with one or more of the 3GPP2 A.S0008 or A.S0009 HRPD IOS standards, which provide compatibility standards for cellular mobile telecommunications systems that operate as a CDMA 2000 HRPD system. To ensure compatibility, radio system parameters and call processing procedures are specified by the standards, including call processing steps that are executed by a HAT and a base station serving the HAT and between the BS and associated infrastructure. However, those of ordinary skill in the art realize that packet switched network 140 may operate in accordance with any one of a variety of wireless packet data communication systems that provide high rate packet data communication services, such as the IEEE (Institute of Electrical and Electronics Engineers) 802.xx standards, for example, the 802.11, 802.15, or 802.16 or 802.20 standards, and that circuit switched network 110 may operate in accordance with any one of a variety of well-known conventional wireless telecommunication systems that provide circuit switched communication services.

A HAT's packet data session may be in an idle, dormant, or active state. A HAT's packet data session is considered to be in the idle state when no network resources, including a traffic channel, or AN to PCF (A8) and PCF to PDSN (A10) bearer resources, have been allocated to the MS. A HAT's packet data session is considered to be in the active state when a point-to-point protocol (PPP) connection has been established between the HAT and PDSN, and a traffic channel and A8 and A10 bearer resources have been allocated to the HAT to facilitate the transfer of packet data between the PDSN and HAT. A HAT's packet data session is considered to be in the dormant state when a PPP connection has been established between the HAT and PDSN, A10 bearer resources have been allocated to the HAT, but traffic channel and A8 bearer resources are not allocated to the HAT.

If circuit switched network 110 includes support for packet data services and a packet data session has been established for a HAT such as HAT 102, a Short Data Burst (SDB) feature of network 110 permits the transfer of packet data frames between the network and HAT 102 over a traffic channel of network 110 when the HAT is engaged in a circuit voice call or active packet data call, and over a common channel of network 110 if the HAT's packet data session is dormant and the HAT is not engaged in a circuit voice call. Packet switched network 140 provides a Data Over Signaling (DOS) feature for a transfer of 'higher layer' data between the packet switched network and a HAT, such as HAT 102, over either a common channel or a traffic channel of the packet switched network when its packet data session has been established and is anchored in the packet switched network. For example, the SDB and DOS features may be used to transfer instant messaging text, email, or a web page to a HAT without requiring a reactivation of the HAT's packet data session, that is, while the HAT's packet data session is dormant.

It may be assumed, for purposes of the present invention, that HAT 102 is monitoring a forward link paging channel, or engaged in a circuit voice call with, circuit switched network 110 and that circuit switched network 110 doesn't support packet data services. In order to access circuit switched network 110, HAT 102 tunes to an operating frequency assigned to the circuit switched network, acquires a pilot channel associated with a serving BS, such as BS 112, and then registers with MSC 20 via BS 112 and a reverse link access channel of air interface 104. Once HAT 102 is registered, the HAT may monitor a forward link paging channel of air interface 104. The paging channel may then be used to notify HAT 102 when a voice call arrives via circuit switched network 110. Alternatively, HAT 102 may originate a circuit voice call after acquiring the pilot channel associated with BS 112 by requesting circuit voice service on a 3G1X reverse link access channel. The paging channel is further used when packet switched network 140 has received packet data from packet data network 152 and requests circuit switched network 110 to page HAT 102 to request the HAT move to the packet switched network so that the packet data can be delivered to the HAT.

When HAT 102 is not engaged in a call with or monitoring a paging channel in circuit switched network 110, the HAT may initiate a packet data call and register with packet switched network 140, and more particularly with PDSN 150. HAT 102 may then establish a data link with PDSN 150 in accordance with a layer 2 protocols such as the point-to-point protocol (PPP). The point-to-point protocol may then be used to assign an IP address to HAT 102. Once the IP address is assigned and a packet data session is established, HAT 102 may communicate with packet switched network 140 over a packet switched network connection. The packet switched network connection, comprising packet data node 144 and preferably comprising an AN and a PCF servicing HAT 102 in network 140, is communicated by the packet switched network 140 to MSC 120 and is stored by the MSC.

The C.S0024 standard provides for the packet switched network packet data session to remain intact whether or not the connection is being used to support communications. That is, when HAT 102 accesses packet switched network 140 to establish a packet data session, the HAT is assigned a traffic channel in air interface 142 and packet data is transferred to the HAT via the traffic channel and the packet switched network connection. During subsequent periods of inactivity, the traffic channel may be torn down but the packet data session remains intact. By maintaining the packet data session, HAT 102 does not have to acquire a new IP address or establish a new PPP connection for a subsequent exchange of data. A packet data session that exists in the absence of a traffic channel is referred to as a "dormant" session. When HAT 102 retunes to an operating frequency of circuit switched network 110, reacquires the pilot channel associated with BS 112, and resumes monitoring the paging channel of air interface 104, the HAT's packet data session is left dormant in packet switched network 140.

While HAT 102 is monitoring, or is engaged in a circuit voice call in, a circuit switched network 110 and has a dormant packet data session anchored on packet switched network 140, the HAT may need to send a small amount of packet data to packet data network 152. In order to avoid HAT 102 having to switch to packet switched network 140 to transfer the packet data and dropping any existing circuit call that may be active, communication system 100 provides for the HAT to convey the packet data to a serving BS, that is, BS 112, of the circuit switched network 110 over the 3G1X air interface. HAT 102 is able to send packet data to circuit switched network 110 even though a packet data session was not established in circuit switched network 110. By contrast, the prior art requires that a packet data session with a Service Option 33 connection (high speed packet data) first be established in circuit switched network 110 when the circuit switched network is capable of supporting packet data services before any packet data can be exchanged between a HAT and a packet data network. BS 112, after determining that the packet data must be sent to packet data network 152, forwards the data to the serving MSC in the circuit switched network, that is, MSC 120 in an ADDS Transfer message. MSC 120 then sends the packet data to packet switched network 140, and more particularly to the AN (A.S0008-A architecture) or the PCF (A.S0009 architecture) of packet data node 144 of the packet switched network, in an ADDS Page or a DOS Deliver message. Packet data node 144 then sends the packet data on to a PDSN supporting HAT 102's packet data session in the packet switched network, that is, PDSN 150, as normal packet data. PDSN 150 may then forward the packet data to packet data network 152. In this way, HAT 102 may convey packet data to packet switched network 140 and further to packet data network 152 without having to leave circuit switched network 110.

Figure 6:
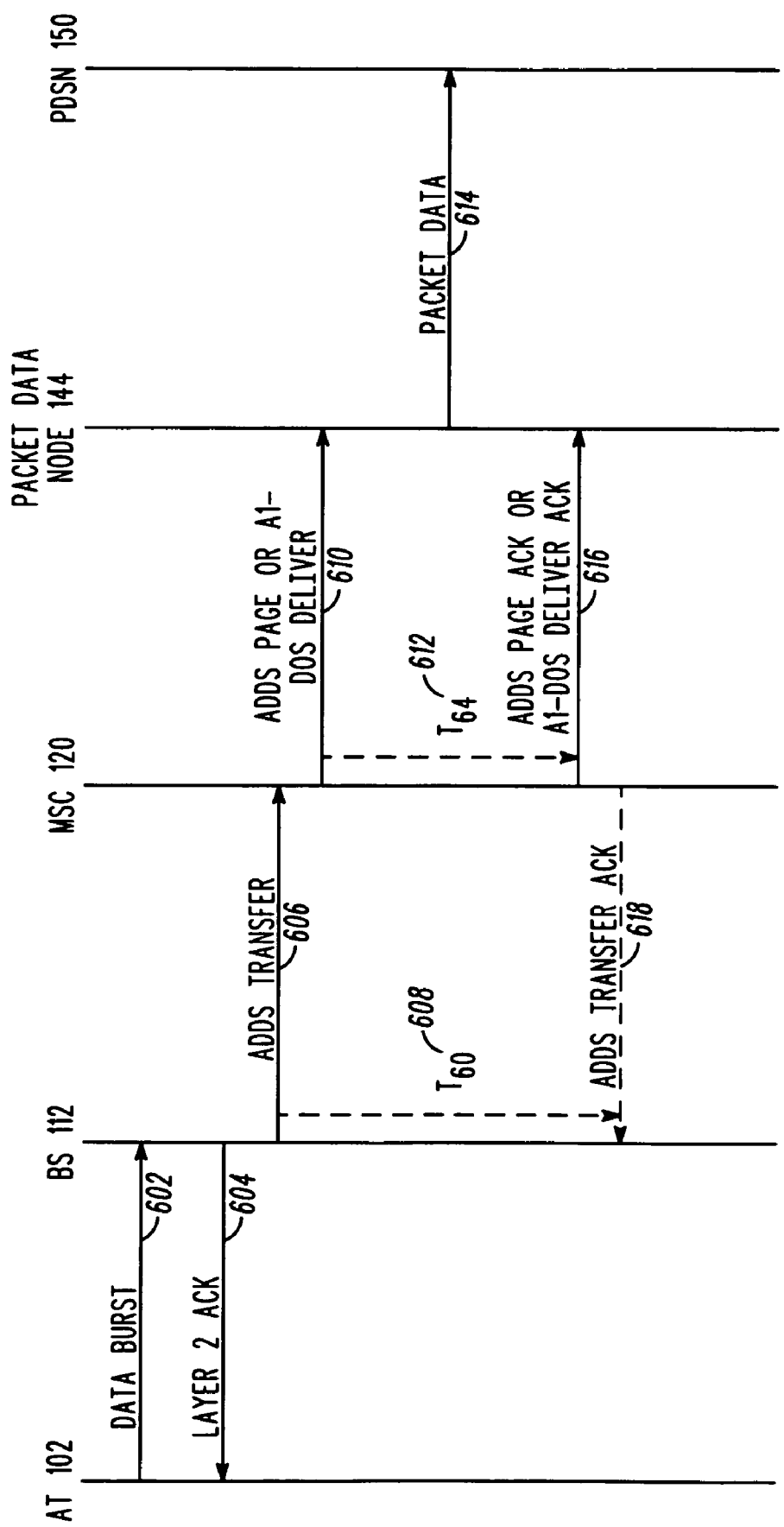
FIG. 6 is a signal flow diagram illustrating a conveyance of packet data from the Hybrid Access Terminal of FIG. 1 to the packet switched network of FIG. 1 via the circuit switched network of FIG. 1 in accordance with various embodiments of the present invention.

Referring now to FIG. 6, a signal flow diagram 600 is provided that illustrates a conveyance of packet data from HAT 102 to packet switched network 140 via circuit switched network 110 in accordance with various embodiments of the present invention. Signal flow diagram 600 begins when HAT 102 is monitoring, or engaged in a call with, circuit switched network 110 and a packet data session associated with the HAT is maintained by packet switched network 140. HAT 102 generates packet data for conveyance to packet data network 152 via packet switched network 140. HAT 102 includes the packet data in a 3G1X Data Burst Message and conveys 602 the Data Burst Message to BS 112 via a reverse link common signaling channel of air interface 104. However, if HAT 102 is active in a voice call in circuit switched network 110, then the HAT may convey the packet data to BS 112 in a Data Burst Message via the reverse link traffic channel of air interface 104 assigned to the call. The reverse link signaling message comprising the Data Burst Message may include a request for confirmation of delivery for the signaling message. The Data Burst Message includes a Data Burst Type field that identifies the data as packet data. The Data Burst Message may further include data fields comprising an HRPD service option (SO), such as SO 59, that identifies the Data Burst as destined for packet switched network 140, and Radio Link Protocol (RLP) information associated with the packet data, that is, an identification of the Radio Link Protocol (RLP) flow to which the packet data is to be sent (HRPD RLPFlowID). When authentication is required, the Data Burst Message may further include any authentication information required to authenticate HAT 102 with 3G1X network 110.

In response to receiving the Data Burst Message, BS 112 acknowledges 604 the received message by conveying a Layer 2 acknowledgment back to HAT 102. Further, in response to receiving the Data Burst Message and based on the Data Burst Type data field included in the message, or alternatively based on the fact that the BS has received an Data Burst Message but no packet data session is established in network 110, BS 112 determines that the data in the message is intended for packet switched network 140 and conveys 606 the message to MSC 120, preferably by conveying an Application Data Delivery Service (ADDS) Transfer message to the MSC that includes the packet data in an Application Data Message field in the ADDS User Part element of the ADDS Transfer message. The ADDS Transfer message may further include a Data Burst Type field in the ADDS User Part element that identifies the data as packet data. BS 112 further conveys to MSC 120 any authentication information received from HAT 102 for use in authenticating the HAT with 3G1X network 110. In addition, BS 112 starts 608 a timer, $T_{60}$.

When MSC 120 receives the ADDS Transfer message, the MSC determines, based on the Data Burst Type field of the ADDS User Part element, that the ADDS Transfer message contains packet data for the packet data network. MSC 120 knows the location of HAT 102's packet data session based on the packet switched network connection stored by the MSC or based on a "cross page" sent earlier by the MSC to packet switched network 140. MSC may then authenticate HAT 102 based on the authentication information received from the HAT, if appropriate, and delivers 610 an A1/A1p message including the packet data to packet data node 144 via the A1/A1p interface and IWS 146. Preferably the A1/A1p message comprises an ADDS Page message or an A1-DOS Deliver message that includes the packet data in an Application Data Message field of an ADDS User Part Element. The ADDS Page message or A1-DOS Deliver message may further includes a Data Burst Type field in the ADDS User Part element that identifies the data as packet data.

In response to receiving the ADDS Page or A1-DOS Deliver message from MSC 120, packet data node 144 conveys 614 the packet data included in the ADDS Page or A1-DOS Deliver message as normal packet data to PDSN 150 on the A10 interface, mapping the data flow to the RLP flow specified by HAT 102. Packet data node 144 may further acknowledge a successful transfer of the data to packet switched network 140 by conveying 616 an acknowledgment, preferably an ADDS Page Ack message or an A1-DOS Deliver Ack message, back to MSC 130 via the A1/A1p interface and IWS 146. If a Tag element comprising a Tag value is included in the ADDS Page or A1-DOS Deliver message, then the packet data node 144 may include the same Tag value in the corresponding ADDS Page Ack or A1-DOS Deliver Ack message. In response to receiving the acknowledgment, MSC 120 may stop 612 timer $T_{64}$ and further may inform BS 112 of a successful transfer of the data to packet switched network 140 by conveying 618 an acknowledgment, preferably an ADDS Transfer Ack message, back to the BS. In response to receiving the acknowledgment from MSC 120, BS 112 stops 608 timer $T_{60}$. When timer $T_{64}$ expires before an acknowledgment is received by MSC 120 from packet data node 144, the MSC may resend the ADDS Page or A1-DOS Deliver message and restart timer $T_{64}$ a configurable number of times before giving up. Similarly, when timer $T_{60}$ expires before an acknowledgment is received by BS 112 from MSC 120, the BS may resend the ADDS Transfer message and restart timer $T_{60}$ a configurable number of times before giving up.

Figure 7:
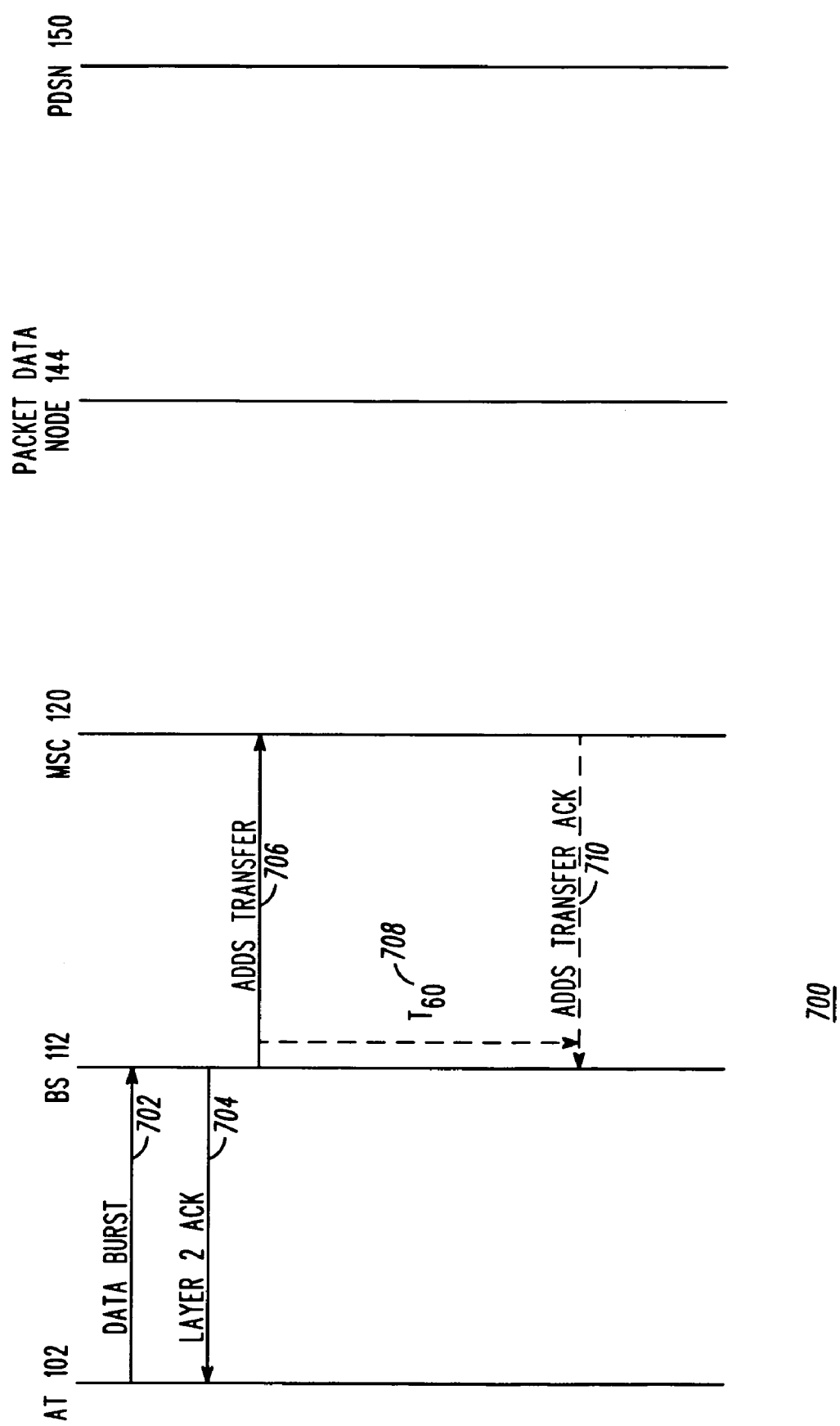
FIG. 7 is a signal flow diagram illustrating a signaling by the communication system of FIG. 1 when packet data that is originated by the Hybrid Access Terminal of FIG. 1 in the circuit switched network of FIG. 1 is not delivered to the packet switched network of FIG. 1 due to an authentication failure in accordance with an embodiment of the present invention.

FIG. 7 is a signal flow diagram 700 illustrating a signaling by communication system 100 when packet data that is originated by HAT 102 in circuit switched network 110 is not delivered to packet switched network 140 due to an authentication failure in accordance with an embodiment of the present invention. Similar to signal flow diagram 600, signal flow diagram 700 begins when HAT 102 is monitoring, or engaged in a call with, circuit switched network 110 and a packet data session associated with the HAT is maintained by packet switched network 140. HAT 102 generates packet data for conveyance to packet data network 152 via packet switched network 140. HAT 102 includes the packet data in 3G1X Data Burst Message and conveys 702 the Data Burst Message to BS 112 via a reverse link common signaling channel of air interface 104. However, if HAT 102 is active in a voice call in circuit switched network 110, then the HAT may convey the packet data to BS 112 in a Data Burst Message via the reverse link traffic channel of air interface 104 assigned to the call. The reverse link signaling message comprising the Data Burst Message may include a request confirmation of delivery for the signaling message. The Data Burst Message includes a Data Burst Type field that identifies the data as packet data. The Data Burst Message may further include data fields comprising an HRPD service option (SO), such as SO 59, that identifies the Data Burst as destined for packet switched network 140, and Radio Link Protocol (RLP) information associated with the packet data, that is, an identification of the Radio Link Protocol (RLP) flow to which the packet data is to be sent (HRPD RLPFlowID). When authentication is required, the Data Burst Message may further include any authentication information required to authenticate HAT 102 with 3G1X network 110.

In response to receiving the Data Burst Message, BS 112 acknowledges 704 the message by conveying a Layer 2 acknowledgment back to HAT 102. Further, in response to receiving the Data Burst Message and based on the Data Burst Type data field included in the message, or alternatively based on the fact that the BS has received a Data Burst Message but no packet data session is established in network 110, BS 112 determines that the data in the message is intended for packet switched network 140 and conveys 706 the message to MSC 120, preferably by conveying an ADDS Transfer message to the MSC that includes the packet data in an Application Data Message field in the ADDS User Part element of the ADDS Transfer message. The ADDS Transfer message further includes a Data Burst Type field in the ADDS User Part element that identifies the data as packet data. BS 112 further conveys to MSC 120 any authentication information received from HAT 102 for use in authenticating the HAT with 3G1X network 110. In addition, BS 112 starts 708 a timer, $T_{60}$. If BS 112 chooses to authenticate HAT 102, the ADDS Transfer message may include the authentication information received from HAT 102 and a BS computed authentication data element.

When MSC 120 receives the ADDS Transfer message, the MSC determines, based on the Data Burst Type field of the ADDS User Part element, that the data included in the ADDS Transfer message is packet data. MSC 120 may then attempt to authenticate HAT 102. When the authentication fails, MSC 120 informs 710 BS 112 of the authentication failure, preferably by conveying an ADDS Transfer Ack message to the BS indicating the authentication failure, and does not forward the packet data to packet switched network 140. In response to being informed of the authentication failure, BS 112 stops 708 timer $T_{60}$.

By providing for HAT 102 to convey packet data to packet switched network 140 and further to packet data network 152 via circuit switched network 110 and air interface 104 associated with the circuit switched network while the HAT is monitoring, or is engaged in a circuit voice call in, the circuit switched network and has a dormant packet data session anchored on the packet switched network, the HAT does not have to leave circuit switched network 110 in order to transfer the packet data, possibly dropping any circuit voice call in the process. In addition, by not requiring HAT 102 to leave the circuit switched network 110 in order to transfer the packet data, when a circuit switched voice call is received for the HAT after the HAT transfers the packet data, the HAT need not be "cross-paged" on the packet switched network, that is, is notified, via a page from the packet switched network, of the circuit switched network service and then leave a packet data session on the packet switched network and move back to the circuit switched network to accept the call.

When HAT 102 is monitoring circuit switched network 110 and has a dormant packet data session on packet switched network 140, the packet switched network may need to send a small amount of packet data to the HAT. Since only a small amount of packet data needs to be sent, packet data node 144 may decide not to reactivate the packet data session on packet switched network 140 and to instead send the packet data to HAT 102 in a DOS message. In order to avoid the MS having to switch to packet switched network 140 for a transfer of the packet data and possibly drop an active circuit voice call, communication system 100 provides for packet switched network 140 to send this data to the HAT via circuit switched network 110. More particularly, the packet data is routed to a packet data node of packet switched network 140, that is, packet data node 144. Packet data node 144 includes the packet data in a BS Service Request message and routes the BS Service Request message to an MSC of circuit switched network 110, that is, MSC 120, where HAT 102 is registered. Circuit switched network 110 then conveys the packet data to the HAT via an air interface of the circuit switched network, that is, air interface 104. In this manner, HAT 102 may receive packet data from packet data network 152 without having to leave circuit switched network 110.

Figure 8:
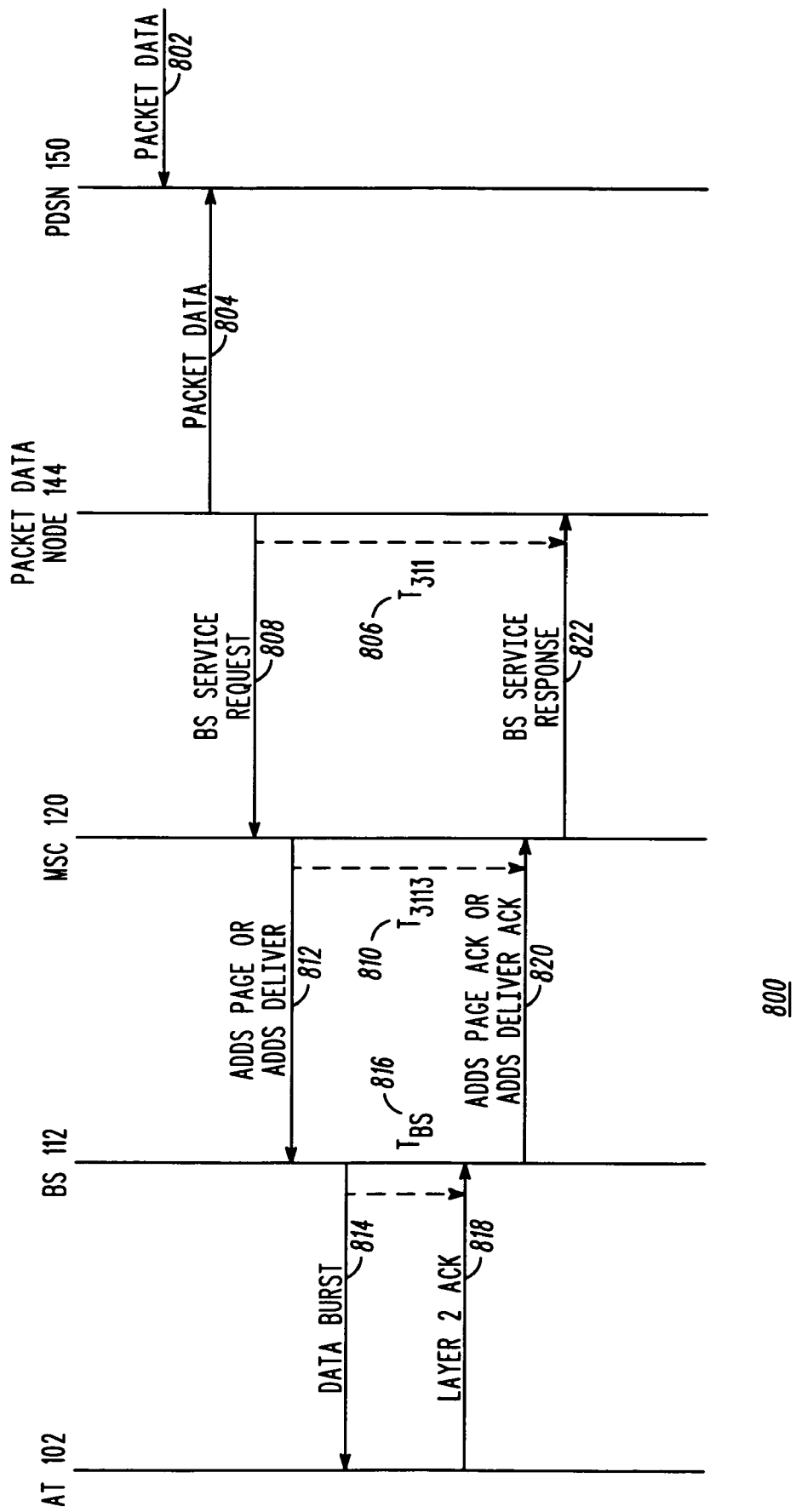
FIG. 8 is a signal flow diagram of a conveyance of packet data by the packet switched network of FIG. 1 to the hybrid Access Terminal of FIG. 1 via the circuit switched network of FIG. 1 in accordance with various embodiments of the present invention.

Referring now to FIG. 8, a signal flow diagram 800 is provided that illustrates a conveyance of packet data by packet switched network 140 to HAT 102 via circuit switched network 110 in accordance with various embodiments of the present invention. Signal flow diagram 800 begins when HAT 102 is monitoring, or engaged in a circuit voice call with, circuit switched network 110 and an existing packet data session associated with the HAT is maintained in packet switched network 140. PDSN 150 receives 802 packet data from packet data network 152 that is intended for HAT 102. In response to receiving the packet data, PDSN 150 conveys 804 the packet data to packet data node 144 via an A10 connection associated with the HAT. PDSN 150 may further provide an indication indicating the suitability of the data for transmission as an HRPD Data Over Signaling (DOS) message in packet switched network 140.

Packet data node 144 conveys 808 the packet data, along with RLP information associated with the packet data session, that is, an identification of an RLP flow, to MSC 120 via the A1/A1p interface and IWS 146. Preferably, packet data node 144 includes the packet data in an A1 BS Service Request message, and more particularly in an Application Data Message field of an ADDS User Part element of the A1 BS Service Request message, that is then conveyed MSC 120. The packet data may further be sent in DOS format as specified in the C.S0024-A-1 specification. Packet data node 144 further buffers the sent packet data in the at least one memory device 304 of the packet data node. In addition, in response to conveying the packet data, packet data node 144 starts 806 a timer, $T_{311}$.

In response to receiving the packet data from packet data node 144, MSC 120 assembles, and conveys 812 to BS 112, an ADDS Page message or an ADDS Deliver message that includes the packet data. When HAT 102 is currently assigned a traffic channel in air interface 104 at BS 112, for example, when the HAT is currently engaged in a voice call, MSC 120 includes the packet data in an ADDS Deliver message that the MSC conveys to BS 112 for delivery over the traffic channel. When HAT 102 is not currently assigned a traffic channel, MSC 120 includes the packet data in an ADDS Page message and conveys the ADDS Page message to BS 112 for delivery over a paging channel of air interface 104. The packet data is included in an Application Data Message field of an ADDS User Part element of the ADDS Page or ADDS Deliver message, and each message further includes a Data Burst Type field that identifies the data as packet data. The ADDS Page and ADDS Deliver message may further include a Tag element that requests that BS 112 wait for a Layer 2 acknowledgment from HAT 102 before the BS acknowledges the ADDS Page or ADDS Deliver message. MSC 120 further starts 810 a timer, $T_{3113}$, and waits for an acknowledgment.

In response to receiving the packet data from MSC 120, BS 112 assembles, and conveys 814 to HAT 102, a circuit switched network Data Burst Message or Extended Data Burst Message that includes the packet data and the RLP flow information. When HAT 102 is currently assigned a traffic channel in air interface 104, the Data Burst Message or Extended Data Burst Message is conveyed over the traffic channel. When HAT 102 is not currently assigned a traffic channel in air interface 104, the Data Burst Message or Extended Data Burst Message is included in a signaling message and conveyed over a common channel of air interface 104. In addition, responsive to conveying the Data Burst Message or Extended Data Burst Message, BS 112 starts 816 a timer, $T_{BS}$.

In response to receiving the circuit switched network Data Burst Message or Extended Data Burst Message, HAT 102 acknowledges 818 receipt of the message by conveying a Layer 2 acknowledgment back to BS 112. In response to receiving the acknowledgment from HAT 102, BS 112 stops 816 timer TBS and informs 820 MSC 120 of a successful delivery of the packet data to HAT 102, preferably by conveying an ADDS Page Ack message (if the data was sent to HAT 102 via a common channel) or an ADDS Deliver Ack message (if the data was sent to HAT 102 via a traffic channel) to the MSC. If a Tag element comprising a Tag value is included in the ADDS Page or ADDS Deliver message, then the BS may include the same Tag value in the corresponding ADDS Page Ack or ADDS Deliver Ack message. However, when BS 112 fails to receive a Layer 2 acknowledgment prior to an expiration of timer TBS, the BS initiates failure procedures and informs MSC 120 of the failure, preferably by convey an ADDS Page Ack or ADDS Deliver Ack message to the MSC that indicates such failure.

When MSC 120 is informed by BS 112 of a successful delivery of the packet data to HAT 102, the MSC stops 810 timer $T_{3113}$ and informs 822 packet data node 144 of the successful delivery of the packet data, preferably by conveying an A1 BS Service Response message to the packet data node via the A1/A1p interface and IWS 146. If a Tag element comprising a Tag value is included in the A1 BS Service Request message, then the MSC may include the same Tag value in the corresponding A1 BS Service Response message. However, when MSC 120 is informed by BSC 112 of a failure to deliver the packet data or fails to be informed of a successful delivery of the Data Burst message to HAT 102 prior to an expiration of timer $T_{3113}$, the MSC informs packet data node 144 of the failure, preferably by conveying an A1 BS Service Response message indicating such failure to the packet data node via the A1/A1p interface and IWS 146.

When packet data node 144 is informed by MSC 120 of a successful delivery of the packet data, the packet data node stops 806 timer $T_{311}$ and PCF 148 discards the buffered data. When packet data node 144 is informed by MSC 120 of the failure to deliver the packet data or fails to be informed of a successful delivery of the packet data prior to an expiration of timer $T_{311}$, the packet data node may then initiate a paging routine as is known in the art, requesting circuit switched network 110 to page the HAT and request that the HAT move to packet switched network 140 and activate the packet switched network packet data connection so that the packet data can be delivered to the HAT. After the HAT is so paged and, in response, moves to packet switched network 140 and a packet switched network packet data session is active, the data buffered by packet data node 144 may be forwarded to HAT 102 via air interface 142.

Figure 9:
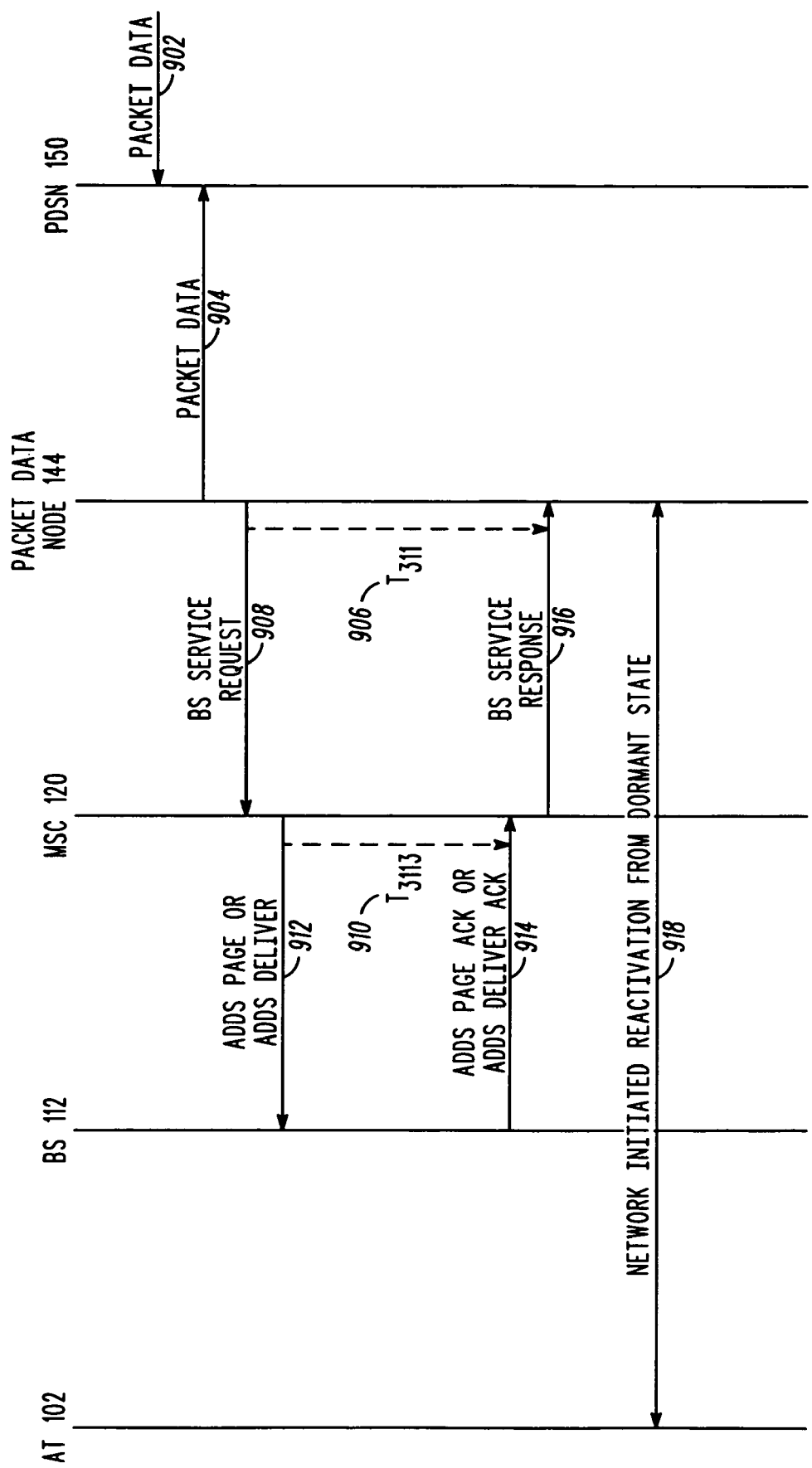
FIG. 9 is a signal flow diagram illustrating a signaling by the communication system of FIG. 1 when packet data that is sourced by the packet switched network of FIG. 1 is not delivered to the Hybrid Access Terminal of FIG. 1 when the hybrid Access Terminal is operating in the circuit switched network of FIG. 1 due to an refusal of the circuit switched network to accept the packet data in accordance with various embodiments of the present invention.

FIG. 9 is a signal flow diagram 900 illustrating a signaling by communication system 100 when packet data that is sourced by packet switched network 140 is not delivered to HAT 102 when the HAT is operating in circuit switched network 110 due to a refusal of the circuit switched network to accept packet data in accordance with various embodiments of the present invention. Similar to signal flow diagram 800, signal flow diagram 900 begins when HAT 102 is monitoring, or engaged in a circuit voice call with, circuit switched network 110 and an existing packet data session associated with the HAT is maintained in packet switched network 140. PDSN 150 receives 902 packet data from packet data network 152 that is intended for HAT 102. In response to receiving the packet data, PDSN 150 conveys 904 the packet data to packet data node 144 via an existing A10 connection associated with the HAT. PDSN 150 may further provide an indication indicating the suitability of the data for transmission as an HRPD DOS message in packet switched network 140.

Packet data node 144 conveys 808 the packet data, along with RLP information associated with the packet data session, that is, an identification of an RLP flow, to MSC 120 via the A1/A1p interface and IWS 146. Preferably, packet data node 144 includes the packet data in an A1 BS Service Request message, and more particularly in an Application Data Message field of an ADDS User Part element of the A1 BS Service Request message, that is then conveyed MSC 120. The packet data may further be sent in DOS format as specified in the C.S0024-A-1 specification. Packet data node 144 further buffers the sent packet data in the at least one memory device 304 of the packet data node. In addition, in response to conveying the packet data, packet data node 144 starts 906 a timer, $T_{311}$.

In response to receiving the packet data from packet data node 144, MSC 120 assembles, and conveys 912 to BS 112, an ADDS Page message or an ADDS Deliver message that includes the packet data. As described above, MSC 120 may include the packet data in an ADDS Deliver message that the MSC conveys to BS 112 for delivery over the traffic channel or may include the packet data in an ADDS Page message that the MSC conveys to BS 112 for delivery over a paging channel of air interface 104. The packet data is included in an Application Data Message field of an ADDS User Part element of the ADDS Page or ADDS Deliver message, and each message further includes a Data Burst Type field that identifies the data as packet data. The ADDS Page and ADDS Deliver message may further include a Tag element that requests that BS 112 wait for a Layer 2 acknowledgment from HAT 102 before the BS acknowledges the ADDS Page or ADDS Deliver Message. MSC 120 further starts 910 a timer, $T_{3113}$, and waits for an acknowledgment.

In response to receiving the packet data from MSC 120, BS 112 rejects the MSC's request to convey the data to HAT 102 via a Data Burst Message or an Extended Data Burst Message. For example, BS 112 may determine not to convey the packet data due to the amount of data packet that must be delivered, or other factors. BS 112 then informs 914 MSC 120 that the packet data is not being conveyed to HAT 102, preferably by conveying an ADDS Page Ack message or an ADDS Delivery Ack message to the MSC and indicating in the ADDS Page Ack or ADDS Delivery Ack message, by setting a predetermined cause value, that the packet data could not to be sent to HAT 102. If a Tag element comprising a Tag value is included in the ADDS Page or ADDS Deliver message, then the BS may include the same Tag value in the corresponding ADDS Page Ack or ADDS Deliver Ack message.

When MSC 120 is informed that the packet data is not being conveyed to HAT 102, the MSC stops 910 timer $T_{3113}$ and informs 916 packet data node 144 of the failed delivery of the packet data, preferably by conveying an A1 BS Service Response message indicating the failed delivery to the packet data node via the A1/A1p interface and IWS 146. If a Tag element comprising a Tag value is included in the A1 BS Service Request message, then the MSC may include the same Tag value in the corresponding A1 BS Service Response message. In response to being informed of the failed delivery, packet data node 144 stops 906 timer $T_{311}$. Packet data node 144 may then initiate 918 paging for packet data service as is known in the art, requesting circuit switched network 110 to page HAT 102 and request that the HAT move to packet switched network 140 and activate the packet switched network connection so that the packet data can be delivered to the HAT. After the HAT is so paged and, in response, moves to packet switched network 140 and a packet switched network packet data session is active, the data buffered by packet data node 144 may be forwarded to HAT 102 via air interface 142.

By providing for packet switched network 140 to convey packet data to HAT 102 via circuit switched network 110 and air interface 104 associated with the circuit switched network when the HAT is monitoring the circuit switched network and has a dormant packet data session on the packet switched network, communication system 100 provides for the transfer of the packet data to the HAT without requiring a reactivation of the packet data session on the packet switched network and without requiring the HAT to switch to the packet switched network and possibly drop an active circuit voice call. By further providing for HAT 102 to convey packet data to packet switched network 140 and further to packet data network 152 via circuit switched network 110 and air interface 104 associated with the circuit switched network while the HAT is monitoring, or is engaged in a circuit voice call in, the circuit switched network and has a dormant packet data session anchored on the packet switched network, the HAT does not have to leave circuit switched network 110 in order to receive or convey such packet data, again possibly dropping any circuit voice call in the process. By not requiring HAT 102 to leave the circuit switched network 110 in order to receive or convey the packet data, when a circuit switched voice call is received for the HAT after the HAT receives or conveys the packet data, the HAT need not be "cross-paged" on the packet switched network, that is, is notified, via a page from the packet switched network, of the circuit switched network service and then leave a packet data session on the packet switched network and move back to the circuit switched network to accept the call. Thus communication system 100 minimizes any need for a HAT in a circuit switched network, such as a 3G1X network, to switch back to a packet data network where the HAT's packet data session is anchored in order to send or receive packet data, possibly dropping any circuit voice call in the process, then returning back to the 3G1X network to resume circuit services, which is inconvenient for the user of the HAT and is wasteful of system resources.

While the present invention has been particularly shown and described with reference to particular embodiments thereof, it will be understood by those skilled in the art that various changes may be made and equivalents substituted for elements thereof without departing from the scope of the invention as set forth in the claims below. Furthermore, one of ordinary skill in the art realizes that the components and operations of the transmitting communication device and receiving communication device detailed herein are not intended to be exhaustive but are merely provided to enhance an understanding and appreciation for the inventive principles and advantages of the present invention, rather than to limit in any manner the invention. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. Furthermore, unless otherwise indicated herein, the use of relational terms, if any, such as first and second, top and bottom, and the like are used solely to distinguish one entity or action from another entity or action without necessarily requiring or implying any actual such relationship or order between such entities or actions.

What is claimed is:

1. A method for conveying user packet data comprising:
   monitoring, by a hybrid access terminal, a forward channel of an air interface associated with a circuit switched communication network;
   maintaining a packet data session associated with the hybrid access terminal in a packet switched communication network; and
   conveying the user packet data by the hybrid access terminal to a base station of the circuit switched communication network, wherein the hybrid access terminal includes the user packet data in a data burst message and routes the data burst message to the base station of the circuit switched communication network;
   conveying the user packet data by the base station to a mobile switching center;
   including, by the mobile switching center, the user packet data in one of an Application Data Delivery Service (ADDS) Page message and a Data over Signaling (DOS) Deliver message; and
   conveying the one of an ADDS Page message and a DOS Deliver message to at least one of an Access Network and a Packet Control Function of the packet switched communication network.

2. The method of claim 1, wherein conveying comprises conveying the user packet data to the circuit switched network via an air interface associated with the circuit switched network.

3. The method of claim 1, wherein routing the user packet data by the base station to a mobile switching center comprises:
   including, by the base station, the user packet data in a circuit switched communication network message; and
   conveying the circuit switched communication network message to the mobile switching center.

4. The method of claim 1, further comprising forwarding the user packet data to a Packet Data Serving Node of the packet switched communication network communication network.

5. The method of claim 1, further comprising attempting to authenticate the hybrid access terminal and wherein forwarding comprises, in response to authenticating the hybrid access terminal, forwarding the user packet data to the at least one of an Access Network and a Packet Control Function of the packet switched communication network, and in response to failing to authenticate the hybrid access terminal, not forwarding the user packet data to the packet switched communication network.

6. A method for transferring user packet data from a hybrid access terminal to a packet switched communication network via a circuit switched communication network, the method comprising:
   receiving, by a base station in the circuit switched communication network from the hybrid access terminal via a circuit switched communication network air interface, the user packet data intended for a packet data network connected to the packet switched communication network, wherein the hybrid access terminal includes the user packet data in a Data Burst Message and routes the data burst message to the circuit switched communication network; and
   forwarding, by the base station of the circuit switched communication network, the user packet data to a mobile switching center, wherein the base station forwards the user packet data to the mobile switching center in an Application Data Delivery Service (ADDS) Transfer message; and
   conveying, by the mobile switching center, the user packet data to at least one of an Access Network and a Packet Control Function of the packet switched communication network.

7. The method of claim 6, further comprising receiving, by the circuit switched communication network from the hybrid access terminal, Radio Link Protocol (RLP) information associated with the user packet data and wherein forwarding comprises forwarding the user packet data and the RLP information to the at least one of an Access Network and a Packet Control Function of the packet switched communication network.

8. The method of claim 6, wherein receiving, by the circuit switched communication network from the hybrid access terminal via a circuit switched communication network air interface, the user packet data associated with the packet switched communication network comprises receiving, by the circuit switched communication network from the hybrid access terminal via the circuit switched communication network air interface, a circuit switched network air interface message comprising the user packet data associated with the packet switched communication.

9. The method of claim 6, wherein forwarding the user packet data to the at least one of an Access Network and a Packet Control Function comprises:
   including the user packet data in one of an Application Data Delivery Service (ADDS) Page message and a Data Over Signaling (DOS) Deliver message; and
   conveying the one of an ADDS Page message and an DOS Deliver message to the at least one of an Access Network and a Packet Control Function.

10. The method of claim 6, further comprising forwarding the user packet data to a Packet Data Serving Node of the packet switched communication network.

11. The method of claim 6, further comprising attempting to authenticate the hybrid access terminal and wherein forwarding comprises, in response to authenticating the hybrid access terminal, forwarding the user packet data to the at least one of an Access Network and a Packet Control Function of the packet switched communication network, and in response to failing to authenticate the hybrid access terminal, not forwarding the user packet data to the packet switched communication network.

12. A method for providing user packet data from a packet switched communication network to a hybrid access terminal monitoring a forward channel in a circuit switched communication network via the circuit switched communication network, the method comprising:
   receiving, by the circuit switched communication network from the packet switched network, the user packet data intended for the hybrid access terminal, wherein receiving comprises receiving one or more of a BS Service Request message and a Data over Signaling (DOS) message from the packet switched communication network that includes the user packet data; and
   conveying, by a mobile switching center to a base station in the circuit switched communication network, the user packet data, wherein the mobile switching center conveys the user packet data to the base station by including the user packet data in one of an Application Data Delivery Service (ADDS) Page message and an ADDS Deliver message; and
   conveying the user packet data by the base station to the hybrid access terminal via an air interface associated with the circuit switched communication network and without requiring the hybrid access terminal to switch to the packet switched communication network.

13. The method of claim 12, further comprising receiving, by the circuit switched communication network from the packet switched communication network, Radio Link Protocol (RLP) information associated with the user packet data and wherein conveying comprises conveying the RLP information to the hybrid access terminal via the air interface of the circuit switched communication network.

14. The method of claim 12, wherein receiving comprises receiving, by the circuit switched communication network from at least one of an Access Network and a Packet Control Function of the packet switched communication network, the user packet data associated with the packet switched communication network.

15. The method of claim 12, wherein conveying the user packet data to the hybrid access terminal via an air interface associated with the circuit switched communication network comprises conveying the user packet data to the hybrid access terminal via a circuit switched communication network traffic channel assigned to a voice call.

16. The method of claim 12, wherein conveying the user packet data to the hybrid access terminal via an air interface associated with the circuit switched communication network comprises conveying the user packet data to the hybrid access terminal via a circuit switched communication network signaling channel.

17. The method of claim 12, further comprising:
determining that the user packet data has not been successfully delivered to the hybrid access terminal by the circuit switched communication network; and
in response to determining that the user packet data has not been successfully delivered to the hybrid access terminal, paging the hybrid access terminal in the circuit switched communication network and requesting that the hybrid access terminal move to the packet switched communication network.

18. The method of claim 17, further comprising:
activating a packet data session on the packet switched communication network when the hybrid access terminal returns to the packet switched communication network; and
conveying the user packet data to the hybrid access terminal via an air interface associated with the packet switched communication network.

19. A method for providing user packet data associated with a packet switched communication network to a hybrid access terminal via a circuit switched communication network, the method comprising:
receiving, by the circuit switched communication network from the packet switched network, user packet data intended for the hybrid access terminal;
rejecting, by a base station of the circuit switched communication network, a request to convey the user packet data to the hybrid access terminal; and
in response to the rejection by the base station of the conveyance of the packet data to the hybrid access terminal, paging the hybrid access terminal in the circuit switched communication network and requesting that the hybrid access terminal move to the packet switched communication network.

20. The method of claim 19, wherein paging comprises:
in response to one of the rejection by the base station of the conveyance of the user packet data to the hybrid access terminal or the user packet data not being received by the hybrid access terminal, requesting, by the packet switched communication network, that the circuit switched communication network page the hybrid access terminal (HAT); and in response to the packet switched communication network request, paging the HAT by the circuit switched communication network and requesting that the HAT move to the packet switched communication network.

21. The method of claim 19, further comprising
activating a packet switched network connection; and
conveying the user packet data to the hybrid access terminal via an air interface of the packet switched communication network.

22. An apparatus that provides for inter-network transfer of user packet data from a hybrid access terminal to a packet switched communication network via a circuit switched communication network, the apparatus comprising:
a base station of the circuit switched communication network that is adapted to receive, from the hybrid access terminal via an air interface associated with the circuit switched communication network, the user packet data that is intended for a packet data network connected to the packet switched communication network and route the user packet data to a mobile switching center, wherein the base station conveys the user packet data to the mobile switching center by including the user packet data in an Application Data Delivery Service (ADDS) message and conveying the ADDS message to the mobile switching center; and
a mobile switching center of the circuit switched communication network that is adapted to receive the user packet data from the base station and convey the user packet data to at least one of an Access Network and a Packet Control Function of the packet switched communication network.

23. The apparatus of claim 22, further comprising a hybrid access terminal, wherein the hybrid access terminal is configured to monitor a channel of an air interface associated with the circuit switched network while a packet data session is associated with the hybrid access terminal in the packet switched communication network and convey user packet data to the to the base station of the circuit switched communication network by use of a Data Burst Message.

24. The apparatus of claim 22, wherein the base station is further configured to receive, from the hybrid access terminal and included in the circuit switched communication network air interface message, Radio Link Protocol (RLP) information associated with the user packet data and conveys the RLP information along with the user packet data to the mobile switching center, and wherein the mobile switching center conveys RLP information along with the user packet data to the at least one of an Access Network and a Packet Control Function of the packet switched communication network.

25. The apparatus of claim 22, wherein the user packet data received by the base station is included a Data Burst Message.

26. The communication system of claim 22, wherein the mobile switching center conveys the user packet data to at least one of an Access Network and a Packet Control Function of the packet switched communication network by including the user packet data in one of an Application Data Delivery Service (ADDS) message and a Data Over Signaling (DOS) message.

27. The apparatus of claim 22, wherein the mobile switching center is configured to convey the user packet data to the at least one of an Access Network and a Packet Control Function by including the user packet data in one of an Application Data Delivery Service (ADDS) Page message and a Data Over Signaling (DOS) Deliver message and conveying the one of an ADDS Page message and an DOS Deliver message to the at least one of an Access Network and a Packet Control Function.

28. The apparatus of claim 22, wherein the mobile switching center is configured to convey the user packet data to the at least one of an Access Network and a Packet Control Function of the packet switched communication network in response to authenticating the hybrid access terminal, and not convey the user packet data to the at least one of an Access Network and a Packet Control Function of the packet switched communication network in response to failing to authenticate the hybrid access terminal.

29. An apparatus that provides for inter-network transfer of user packet data from a packet switched communication network to a hybrid access terminal via a circuit switched communication network, the apparatus comprising:
- a base station of the circuit switched communication network that is configured to receive the user packet data from the packet switched communication network and convey the user packet data to the hybrid access terminal via an air interface associated with the circuit switched communication network, wherein the hybrid access terminal is not required to switch to the packet switched communication network in order to receive the user packet data; and
- a mobile switching center of the circuit switched communication network that is configured to receive the user packet data from the packet switched communication network via one or more of a BS Service Request message and a Data over Signaling (DOS) message and convey the user packet data to the base station by including the user packet data in one of an Application Data Delivery Service (ADDS) Page message and an ADDS Deliver message.

30. The apparatus of claim 29, wherein the base station is further configured to receive, from the packet switched communication network, Radio Link Protocol (RLP) information associated with the user packet data and convey the RLP information along with the user packet data to the hybrid access terminal via the air interface associated with the circuit switched communication network.

31. The apparatus of claim 29, wherein the base station receives the user packet data from at least one of an Access Network and a Packet Control Function.

32. The apparatus of claim 29, wherein the base station receives the user packet data and Radio Link Protocol flow information from the packet switched communication network in the BS Service Request message.

33. The apparatus of claim 29, wherein the circuit switched communication network conveys the user packet data to the hybrid access terminal via a circuit switched communication network air interface message.

34. The apparatus of claim 29, wherein the base station conveys the user packet data to the hybrid access terminal via a circuit switched communication network traffic channel assigned to a voice call.

35. The apparatus of claim 29, wherein the base station conveys the user packet data to the hybrid access terminal via a circuit switched communication network signaling channel.

36. The apparatus of claim 29, wherein the base station determines that the user packet data has not been successfully delivered to the hybrid access terminal and pages the hybrid access terminal and requests that the hybrid access terminal move to the high rate packet data communication network.

37. A communication system that provides for inter-network transfer of user packet data from a packet switched communication network to a hybrid access terminal via a circuit switched communication network, the system comprising:
- a mobile switching center of the circuit switched communication network that receives user packet data from the packet switched communication network that is intended for the hybrid access terminal and conveys the user packet data to a base station of the circuit switched communication network; and
- a base station of the circuit switched communication network that is in communication with the mobile switching center and that receives the user packet data from the mobile switching center, rejects a request to convey the user packet data to the hybrid access terminal, and informs the mobile switching center of the rejection of the request.

* * * * *